United States Patent Office 3,452,633
Patented July 1, 1969

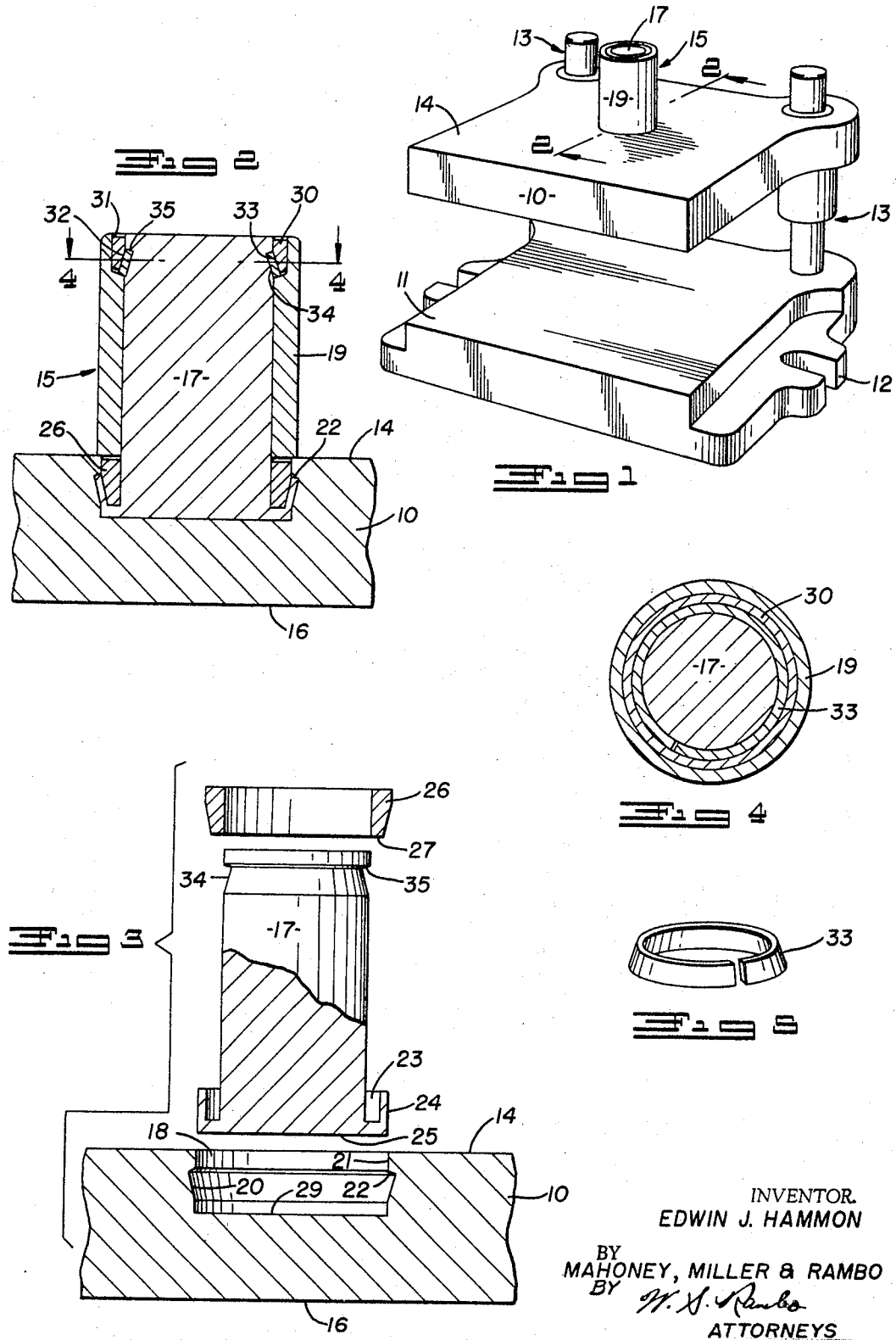

3,452,633
DIE SET SHANK CONSTRUCTION
Edwin J. Hammon, Bedford Heights, Ohio, assignor to Lempco Industrial, Inc., Bedford, Ohio, a corporation of Ohio
Filed Dec. 13, 1966, Ser. No. 601,415
Int. Cl. B26d 5/08; F16b 9/02
U.S. Cl. 83—637                    4 Claims

ABSTRACT OF THE DISCLOSURE

A composite shank for a die set in which the shank includes an inner core element having a distortable annular flange for locking engagement with an undercut socket formed in the movable shoe plate of the die set, and an outer size-determining sleeve element carried on the core element, with wedge-shaped ring elements for locking the core element in the undercut socket of the shoe plate and for locking the sleeve element to the core element.

---

This invention relates to a die set shank construction. It has to do, more particularly, with the shank which projects from one of the plates or shoes of a die set and is used for connecting that plate or shoe to the cooperating part of the press. As will be understood by those skilled in the art, the die sets usually comprise upper and lower shoe components which are attached to cooperating, relatively movable members of the press, and are adapted to support in mating registry a pair of cooperative punch and die members, for stamping or punching a workpiece inserted therebetween. The shank is disclosed specifically herein, for example, as being applied to the upper surface or face of the upper shoe for connecting it in flat contact to the lower surface or face of the movable upper press member but it is not limited to this specific application.

It is well understood in the art that a shank of this general nature must be regidly and accurately fixed to the shoe in projecting relationship thereto for ease and accuracy in positioning it in the receiving socket formed in the press member. Various arrangements have been provided in the past for securing the shank to the shoe. One has included a socket formed in the one surface of the shoe but not extending entirely therethrough to the working surface thereof and with the shank welded rigidly in the socket. However, this welding operation usually distorts or warps the working face of the shoe, which must be very accurately finished, and requires expensive reworking of that surface. Also, since because of this welding requirement the shanks must be mounted on the shoes at the factory, considerable inventory of die sets py the dealer is required due to the many different sizes of shanks necessary to fit all of the various types of presses. Another method employs a shank with a reduced screw-threaded end which is screwed into a threaded socket or bore extending completely through the shoe to the working face thereof and is keyed therein by a key driven from the working face of the shoe. Since the shank material and shoe material are different, this makes the drilling, that may be needed at the working face for mounting punch or die parts on the shoe, difficult when parts of the bore are in the two different materials.

It is the main object of this invention to provide a shank construction which can be accurately and rigidly positioned in projecting relationship to the one surface of a die set shoe of the type indicated, which is made as an assembly including interchangeable parts to permit selective variations thereof in accordance with the size and nature of the sockets in the press members of various manufacturers into which it is to fit so that it will not be necessary for the dealer to have a large inventory of die sets with attached shanks but the shank assemblies can be varied with the interchangeable parts and the assemblies can be mounted on the shoe by the use of simple tools to fit various types and sizes of sockets in the various press members.

Another object of this invention is to employ a shank assembly which does not require welding into the socket in the shoe which might cause distortion of the shoe.

A further object of this invention is to provide a shank assembly which can be mounted and keyed on the shoe without boring a receiving socket entirely through the shoe to the working face thereof.

Various other objects will be apparent as this description progresses.

The shank assembly of this invention is illustrated in the accompanying drawing applied to a die shoe but, as previously indicated, many variations may be made in its application without departing from basic principles of the invention.

In this drawing:

FIGURE 1 is a perspective view of a die set showing the shank assembly of this invention applied to the upper shoe and projecting from the upper surface thereof.

FIGURE 2 is a vertical sectional view taken on line 2—2 of FIGURE 1 and axially through the shank assembly.

FIGURE 3 is an exploded view, partly in vertical section and partly in elevation, showing the core and lower wedging collar of the shank assembly and the associated die shoe.

FIGURE 4 is a horizontal or transverse sectional view taken along line 4—4 of FIGURE 2 through the shank assembly.

FIGURE 5 is a perspective view of a wedging keying collar used in the assembly.

With particular reference to FIGURE 1, there is illustrated a die set of the type previously discussed which is shown as comprising an upper shoe 10 and a lower shoe 11. The lower shoe may be fastened to the lower member of the press by means including the slotted, laterally extending lugs 12. The upper shoe is adapted to be mounted on the upper member of the press by the upstanding shank assembly of this invention which is indicated generally at 15. The shoes will reciprocate relatively with the press members and may be guided in this reciprocation by guide post and bushing units 13 of a suitable type.

The shank assembly 15 is mounted centrally of the upper surface or face 14 of the shoe 10 without having any bores or sockets extending through to the working face 16 thereof and without any welding operation. In general, the shank assembly 15 of this invention comprises a central stud 17 which is mounted in a suitable upwardly opening socket 18 in the face 14 of the shoe, and a separate sleeve 19 which is mounted on the portion of the stud projecting upwardly from the surface 14 and is non rotatably fixed thereto.

The socket 18 is formed in the upper surface 14 of the shoe and, as indicated, it is of circular outline and extends only partly through the shoe having a bottom 29 which is indicated as being flat but could have a tapered surface. Just above the bottom and spaced inwardly from the upper surface 14, the wall of the socket is provided with an annular undercut locking groove 20. Above this groove the socket has a straight, vertical, cylindrical wall surface 21 thereby providing an annular shoulder 22 spaced inwardly slightly from the upper open end of the socket.

The stud 17 is mainly of cylindrical form and has a flat lower end and at this end the stud is provided with an integral enlargement 25 which has an upwardly opening groove 23 therein which thereby provides an upstanding flange 24 that is normally coaxial with the body of the stud. The enlargement 25 has an outside diameter just slightly less than the internal diameter of the socket at the surface 21 so that it can slip axially downwardly into the socket to a position where the lower end of the stud will be in contact with the bottom of the socket. To lock it in this position, a locking and wedging collar 26 is provided. This collar has an internal diameter slightly greater than the external diameter of the body of the stud 17 so that it can slip axially downwardly thereover. Its exterior surface is tapered to provide a lower edge 27 which is wedge-shaped in vertical cross section. The maximum external diameter of the collar 26 is just slightly less than the internal diameter of the socket at the surface 21. It is greater than the internal diameter of the annular upstanding flange 24 whereas its minimum external diameter at the lower edge 27 is less than the interial diameter of the flange 24. Consequently, if the stud 17 has its lower end positioned in the socket 18, the collar 26 can have its lower wedge-shaped edge 27 positioned in the groove 23 and then, if the collar 26 is driven downwardly, it will wedge into the groove 23 and bend the flange 24 outwardly so that its upper edge 28 will be positioned beneath the annular shoulder 22 in locking engagement therewith. Thus, the stud 17 will be locked downwardly in the socket and nonrotatably therein.

The projecting stud 17 thus fixed to the die shoe 10 in upstanding relationship to the upper surface thereof is adapted to receive the sleeve 19 which has an internal diameter just slightly greater than the diameter of the body of the stud 17 so that it will slip axially downwardly thereover. A series of these sleeves may be provided and will be interchangeable so that a selected sleeve can be mounted on the projecting portion of the stud. The various sleeves will be of various external diameters or exterior surface contours depending upon the nature of the sockets in the various die members into which they are to fit, respectively. All the sleeves, however, will have a standard inner diameter so that they will slip over the one standard size stud and will be of a standard length so that when the inner end of the sleeve contacts the surface 14, its outer end will be substantially flush with the outer end of the stud 17.

The dealer may have a desired number of standard studs 17 in stock and a desired supply of different types of sleeves 19. The stud may be easily mounted in the socket 18 and then a sleeve 19 of the series may be selected and mounted on the stud. To lock the sleeve on the stud, another wedging and locking collar 30, similar to the collar 26, is provided. This collar 30 is of annular form and is adapted to slip axially downwardly into a recess 31 formed in the inner surface of the sleeve 19 at its upper edge. This collar is similar to the collar 26 except the tapered surface 32 which results in its wedge-shaped lower edge is on its inner surface. The upper surface of the stud 17 is provided with an annular undercut groove 34 which is adapted to receive a lock washer 33 which is of annular split form. This washer will be positioned over the upper end of the stud after the sleeve 19 is positioned thereon and as it is moved axially downwardly, it will snap into the undercut groove 34. It will be noted that the washer 33 is tilted inwardly to correspond to that of the inner surface of the groove 34 with the result that its upper edge will engage with the outer locking shoulder 35 provided by the groove slightly below the upper flat end of the stud. Now to lock the sleeve 19 to the stud, it is merely necessary to properly position the wedging collar 30 in the recess 31 around the outer end of the stud and drive it inwardly, thereby wedging it between the washer 32 and the wall of the recess 31 to firmly lock the sleeve 19 on the stud 17.

Thus, the wedging and locking collar arrangement at the lower end of the stud, including collar 26, will lock the stud 19 to the die member 10 in an axially fixed, non-rotative position and similarly the wedging and locking collar arrangement at the upper end of the stud 17, including the collar 30, will lock the sleeve 19 on the stud 17 in an axially fixed, nonrotative position. The locking operations may be accomplished readily by the dealer merely by using a hammer and a simple driving sleeve for engaging the collars.

It will be apparent that the above-described invention provides a shank of simple, inexpensive structure in which the stud core can be mounted in the die shoe without distortion of the shoe and without drilling entirely through the shoe to the working face thereof. The provision of interchangeable sleeves of various types and sizes that can be selectively mounted on the core studs of standard form by simple tools greatly reduces the necessary inventory which must be maintained by the dealer.

Having thus described this invention, what is claimed is:

1. In a die set; a die-supporting shoe having a socket communicating with one surface thereof, said socket being formed with an undercut portion; a shank projecting outwardly from said one surface of said shoe and having an end portion formed with a circumferentially enlarged annular flange and disposed in the socket of said shoe; and means for relatively distorting said shank in the region of said socket to thereby interlock said shank and said shoe against relative displacement, said last-named means comprising an annular wedge collar engaged with said end portion of said shank and expanding said flange into the undercut portion of said socket.

2. A die set according to claim 1, wherein said shank includes an opposite end portion formed with an undercut shoulder, and an outer sleeve closely telescoping said shank and extending outwardly from the socket of said shoe, and wherein said outer sleeve is rigidly secured to said shank by wedge means positioned between said sleeve and the undercut shoulder of said shank.

3. A die set according to claim 1, wherein the circumferentially enlarged flange of said shank, for the most part thereof, is disposed in concentrically spaced relation to the main body portion of said shank and defines therewith an annular groove, and wherein said wedge collar is force-fitted into said groove.

4. In a die set; a die-supporting shoe member having a socket opening at one surface thereof; a shank member of substantially solid cross-section projecting outwardly from said one surface of said shoe member and having an end portion thereof disposed in the socket of said shoe member; and means for locking said shoe and shank members against relative displacement, said last-named means comprising a deformable flange formed integrally with one of said members and bounded by a groove opening toward said one surface of said shoe member, an undercut recess formed on the other of said members adjacent said flange, and a locking member force-fitted into said groove and deforming said flange into the undercut recess of the other of said members.

References Cited

UNITED STATES PATENTS

| | | |
|---|---|---|
| 2,099,026 | 11/1937 | Markel et al. _____ 285—213 X |
| 2,445,574 | 7/1948 | Grunow _____ 83—637 |
| 2,755,112 | 7/1956 | Klancnik _____ 287—20.3 X |
| 2,832,130 | 4/1958 | Harvey _____ 285—222 X |

ANDREW R. JUHASZ, Primary Examiner.

U.S. Cl. X.R.

287—203